(12) United States Patent
Koide et al.

(10) Patent No.: US 10,730,519 B2
(45) Date of Patent: Aug. 4, 2020

(54) SWITCHBACK CONTROL APPARATUS FOR INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Aichi-ken (JP); Hirokazu Kobayashi, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 15 days.

(21) Appl. No.: 16/164,851

(22) Filed: Oct. 19, 2018

(65) Prior Publication Data

US 2019/0118818 A1    Apr. 25, 2019

(30) Foreign Application Priority Data

Oct. 23, 2017  (JP) .................. 2017-204244

(51) Int. Cl.
*B60W 10/06* (2006.01)
*B60W 30/18* (2012.01)
(Continued)

(52) U.S. Cl.
CPC ...... *B60W 30/18036* (2013.01); *B60W 10/06* (2013.01); *B60W 10/11* (2013.01); *F16H 61/0246* (2013.01); *F16H 61/16* (2013.01); *F16H 61/682* (2013.01); *F16H 63/50* (2013.01); *B60W 30/18045* (2013.01); *B60W 2510/1005* (2013.01); *B60W 2520/10* (2013.01); *B60W 2710/0644* (2013.01); *B60W 2710/1005* (2013.01); *B60Y 2200/15* (2013.01); *F16H 59/44* (2013.01); *F16H 59/70* (2013.01); *F16H 2059/0256* (2013.01);
(Continued)

(58) Field of Classification Search
CPC .............. Y10T 477/675; Y10T 477/68; B60W 30/18045; B60W 30/18036; B60W 10/11; B60W 10/06; B60W 2710/1005; B60W 2710/0644; B60W 2520/10; B60W 2510/1005
See application file for complete search history.

(56) References Cited

U.S. PATENT DOCUMENTS 6,782,961 B1    8/2004  Ishikawa et al.

FOREIGN PATENT DOCUMENTS

JP    2001-116129 A    4/2001
JP    2006-322413 A    11/2006
(Continued)

*Primary Examiner* — Roger L Pang
(74) *Attorney, Agent, or Firm* — Sughrue Mion, PLLC (57) ABSTRACT

A switchback control apparatus for an industrial vehicle, includes a forward and reverse operating part, a forward and reverse position detector detecting a position of the forward and reverse operating part, a vehicle speed detector; and a shift control section shifting the transmission forcibly to a first speed stage and then, releasing the first speed stage of the transmission that is set forcibly when the forward and reverse operating part is shifted from the forward position to the reverse position or from the reverse position to the forward position by the forward and reverse position detector and a vehicle speed detected by the vehicle speed detector greater is than or equal to a threshold value that is smaller than a shift-up vehicle speed for shifting the transmission from the first speed stage to a second speed stage.

6 Claims, 6 Drawing Sheets

(51) Int. Cl.
    *F16H 61/16*    (2006.01)
    *F16H 61/02*    (2006.01)
    *F16H 63/50*    (2006.01)
    *B60W 10/11*    (2012.01)
    *F16H 61/682*    (2006.01)
    F16H 59/44    (2006.01)
    F16H 59/02    (2006.01)
    F16H 59/70    (2006.01)

(52) U.S. Cl.
    CPC .... *F16H 2059/708* (2013.01); *F16H 2312/09* (2013.01); *Y10T 477/675* (2015.01); *Y10T 477/68* (2015.01)

(56) References Cited

FOREIGN PATENT DOCUMENTS

| | | |
|---|---|---|
| JP | 2007-016921 A | 1/2007 |
| JP | 2008-138700 A | 6/2008 |

SWITCHBACK CONTROL APPARATUS FOR INDUSTRIAL VEHICLE

BACKGROUND ART

The present disclosure relates to a switchback control apparatus for an industrial vehicle.

An industrial vehicle such as a forklift truck performs a peculiar switchback operation in which the traveling direction of the industrial vehicle is switched in a forward direction or in a reverse direction during traveling. Japanese Patent Application Publication No. 2007-16921 discloses a switchback control apparatus. The switchback control apparatus includes a two-speed reversible transmission, a forward and reverse lever for shifting the shift stage of the transmission to the forward movement, the neutral state, or the reverse movement, a vehicle speed sensor for detecting the speed of the vehicle, a traveling direction sensor for detecting the traveling direction of the vehicle, and a controller for controlling the transmission to shift forcibly to the first speed stage when the traveling direction of the vehicle differs from the position of the forward and reverse lever in a state in which the vehicle travels at the second speed or more.

In the above-described switchback control apparatus, when the position of the forward and reverse lever does not coincide with the traveling direction of the vehicle that is detected by the traveling direction sensor, the controller determines that the switchback starts and then, controls the transmission to shift forcibly to the first speed stage. Subsequently, when the position of the forward and reverse lever coincides with the traveling direction of the vehicle that is detected by the traveling direction sensor, the controller determines that the switchback ends and then, releases the first speed stage of the transmission that is set forcibly. Since the switchback control apparatus needs the traveling direction sensor to control the switchback operation, the cost of the switchback control apparatus increases.

The present disclosure is directed to providing a switchback control apparatus for an industrial vehicle, which can control the transition of the transmission to a first speed stage that is set forcibly and release the first speed stage of the transmission that is set forcibly in a switchback operation without a sensor for detecting a traveling direction of the industrial vehicle.

SUMMARY

In accordance with an aspect of the present disclosure, there is provided a switchback control apparatus for an industrial vehicle in which rotation of an engine is transmitted to a transmission to rotate wheels, including a forward and reverse operating part having a forward position, a reverse position, and a neutral position for shifting the transmission to forward movement, reverse movement, and neutral state, respectively, a forward and reverse position detector detecting a position of the forward and reverse operating part, a vehicle speed detector detecting a vehicle speed of the industrial vehicle, and a shift control section setting the transmission forcibly to a first speed stage and then, releasing the first speed stage of the transmission that is set forcibly, when the shift control section determines that the forward and reverse operating part is shifted from the forward position to the reverse position or from the reverse position to the forward position by the forward and reverse position detector and that a vehicle speed detected by the vehicle speed detector is greater than or equal to a threshold value that is smaller than a shift-up vehicle speed at which the transmission is shifted from the first speed stage to a second speed stage.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the embodiments together with the accompanying drawings in which.

DETAILED DESCRIPTION OF THE EMBODIMENTS

The following will describe an embodiment of the present disclosure with reference to FIGS. 1 through 6.

Figure 1:
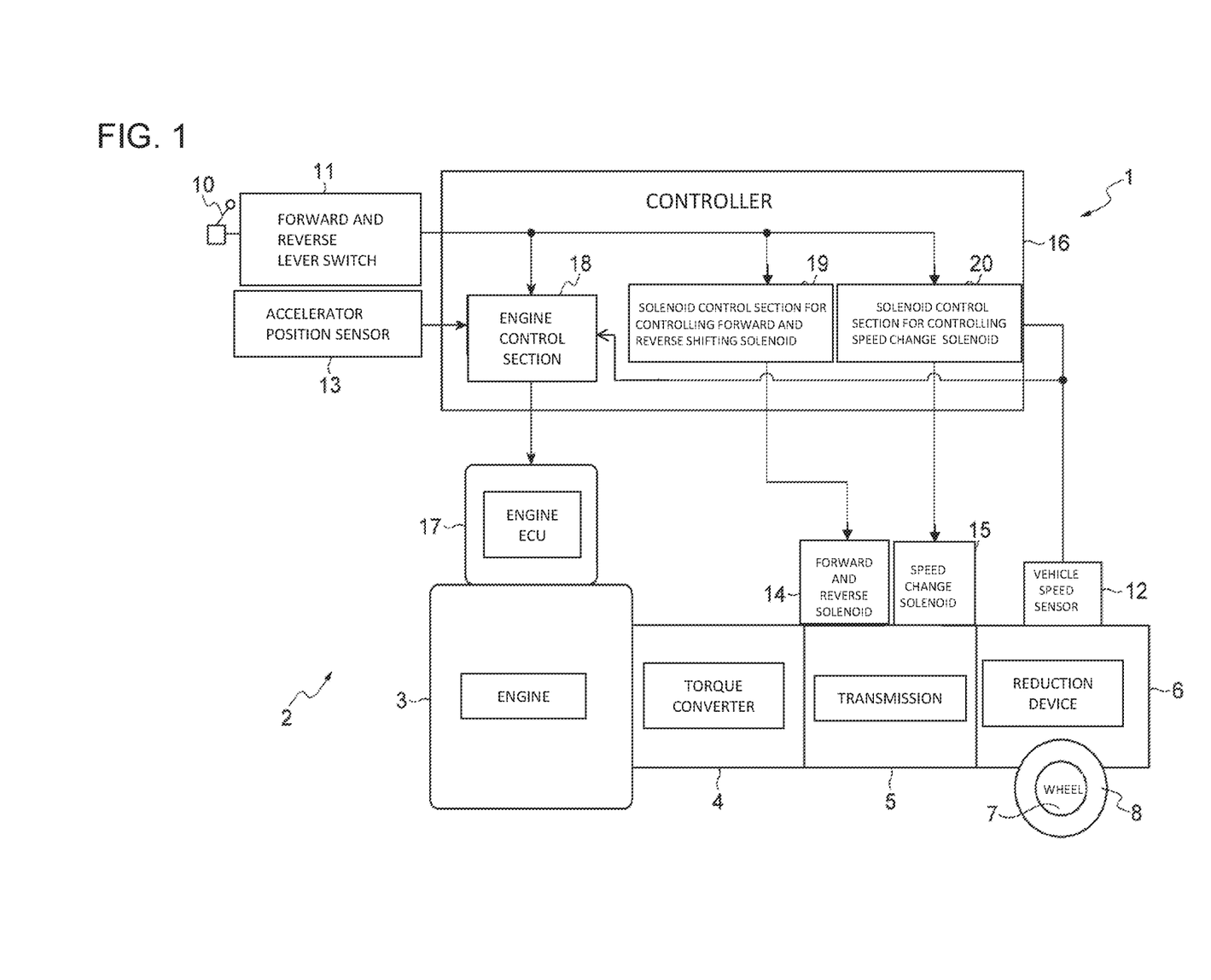
FIG. 1 is a schematic block diagram of an industrial vehicle including a switchback control apparatus for the industrial vehicle, according to an embodiment of the present disclosure.

Referring to FIG. 1, a switchback control apparatus 1 according to the present embodiment is mounted in an engine-powered forklift truck 2 as an industrial vehicle.

The forklift truck 2 includes an engine 3 and a transmission 5 connected to the output shaft of the engine 3 via a torque converter 4. The rotation of the engine 3 is transmitted to the transmission 5 via the torque converter 4. The transmission 5 is a two-stage transmission that includes a plurality of gears and a clutch and can transmit the torque at two speeds in the forward movement or in the reverse movement.

The transmission 5 is connected to a pair of right and left wheels 7 via a reduction device 6 and an axle shaft (not shown in the drawing). Each wheel 7 is fitted with a tire 8 in the outer periphery of the wheel 7. The rotation transmitted to the transmission 5 is transmitted to the wheels 7 via the reduction device 6 and the axle shaft to rotate the wheels 7, so that the forklift truck 2 travels.

The forklift truck 2 includes a forward and reverse lever 10, a forward and reverse lever switch 11, a vehicle speed sensor 12, an accelerator position sensor 13, a forward and reverse shifting solenoid 14, a speed change solenoid 15, a controller 16, and an engine ECU 17.

The forward and reverse lever 10 serves as a forward and reverse operating part in the present disclosure and has a forward position, a reverse position, and a neutral position for shifting the transmission 5 to forward movement, reverse movement, and neutral state, respectively. The forward and reverse lever switch 11 serves as a forward and reverse position detector in the present disclosure for detecting the position of the forward and reverse lever 10. The vehicle speed sensor 12 serves as a vehicle speed detector in the present disclosure for detecting the vehicle speed of the forklift truck 2. The vehicle speed sensor 12 detects the vehicle speed of the forklift truck 2 as an absolute value. The accelerator position sensor 13 detects the accelerator pedal position of the forklift truck 2.

The forward and reverse shifting solenoid 14 shifts the output rotational direction of the transmission 5 to the forward direction, the reverse direction, or the neutral position. The speed change solenoid 15 shifts the shift stage of the transmission 5 to a first speed stage or a second speed stage. For example, the forward and reverse shifting solenoid 14 and the speed change solenoid 15 change the position of the clutch of the transmission.

The controller 16 and the engine ECU 17 are consisted of a CPU, a RAM, a ROM, and an input-output interface device. The function of the engine ECU 17 may be included in the controller 16.

The controller 16 includes an engine control section 18, a solenoid control section 19 for controlling the forward and reverse shifting solenoid 14 (hereinafter referred to as solenoid control section 19), and a solenoid control section 20 for controlling the speed change solenoid 15 (hereinafter referred to as solenoid control section 20).

The engine control section 18 determines an engine speed command value for the engine 3 (hereinafter referred to as engine speed command value) based on the accelerator pedal position of the forklift truck 2 that is detected by the accelerator position sensor 13, and then, outputs the engine speed command value to the engine ECU 17. As the accelerator pedal position increases, the engine control section 18 increases the engine speed command value.

The engine control section 18 limits the engine speed command value based on the position of the forward and reverse lever 10 that is detected by the forward and reverse lever switch 11, and the vehicle speed of the forklift truck 2 that is detected by the vehicle speed sensor 12. It will be described later how the engine control section 18 limits the engine speed command value.

The solenoid control section 19 controls the forward and reverse shifting solenoid 14 based on the position of the forward and reverse lever 10 that is detected by the forward and reverse lever switch 11. Specifically, when the forward and reverse lever 10 is located at the forward position, the solenoid control section 19 controls the forward and reverse shifting solenoid 14 so that the output rotational direction of the transmission 5 becomes forward movement. When the forward and reverse lever 10 is located at the reverse position, the solenoid control section 19 controls the forward and reverse shifting solenoid 14 so that the output rotational direction of the transmission 5 becomes reverse movement. When the forward and reverse lever 10 is located at the neutral position, the solenoid control section 19 controls the forward and reverse shifting solenoid 14 so that the output rotational direction of the transmission 5 becomes neutral.

The solenoid control section 20 controls the speed change solenoid 15 based on the vehicle speed detected by the vehicle speed sensor 12 and the position of the forward and reverse lever 10 that is detected by the forward and reverse lever switch 11.

Specifically, when the current shift stage of the transmission 5 is the first speed stage and the vehicle speed detected by the vehicle speed sensor 12 is greater than or equal to a shift-up vehicle speed for shifting from the first speed stage to the second speed stage, the solenoid control section 20 controls the speed change solenoid 15 so that the shift stage of the transmission 5 is shifted up from the first speed stage to the second speed stage. When the current shift stage of the transmission 5 is the second speed stage and the vehicle speed detected by the vehicle speed sensor 12 is less than or equal to a shift-down vehicle speed for shifting from the second speed stage to the first speed stage, the solenoid control section 20 controls the speed change solenoid 15 so that the shift stage of the transmission 5 is shifted down from the second speed stage to the first speed stage. The shift-up vehicle speed and the shift-down vehicle speed may be the same as in the forward movement and in the reverse movement or may be different in the forward movement and in the reverse movement.

The solenoid control section 20 controls the transition of the transmission 5 to the first speed stage that is set forcibly and releases the first speed stage of the transmission 5 that is set forcibly based on the position of the forward and reverse lever 10 that is detected by the forward and reverse lever switch 11 and the vehicle speed of the forklift truck 2 that is detected by the vehicle speed sensor 12. It will be described later how the solenoid control section 20 controls the transition of the transmission 5 to the first speed stage that is set forcibly and releases the first speed stage of the transmission 5 that is set forcibly.

The engine ECU 17 controls the engine speed of the engine 3 based on the engine speed command value determined by the engine control section 18.

Thus, the switchback control apparatus 1 includes the forward and reverse lever switch 11, the vehicle speed sensor 12, the accelerator position sensor 13, the forward and reverse shifting solenoid 14, the speed change solenoid 15, the engine ECU 17, the engine control section 18, the solenoid control section 19, and the solenoid control section 20.

When the solenoid control section 20 and the speed change solenoid 15 determine that the forward and reverse lever 10 is shifted from the forward position to the reverse position or from the reverse position to the forward position by the forward and reverse lever switch 11 and that the vehicle speed detected by the vehicle speed sensor 12 is greater than or equal to a threshold value A that is smaller than the shift-up vehicle speed at which the transmission 5 is shifted from the first speed stage to the second speed stage, the solenoid control section 20 and the speed change solenoid 15 serve as a shift control section in the present disclosure that shifts the shift stage of the transmission 5 forcibly to the first speed stage and then, releases the first speed stage of the transmission 5 that is set forcibly.

When the engine control section 18 and the engine ECU 17 determine that the forward and reverse lever 10 is shifted from the forward position to the reverse position or from the reverse position to the forward position by the forward and reverse lever switch 11 and that the vehicle speed detected by the vehicle speed sensor 12 is greater than or equal to the threshold value A (described above), the engine control section 18 and the engine ECU 17 serve as an engine speed control section in the present disclosure that limits the engine speed command value so that the engine speed of the engine 3 is limited toward a target engine speed B that is smaller than the engine speed corresponding to the threshold value A.

Figure 2:
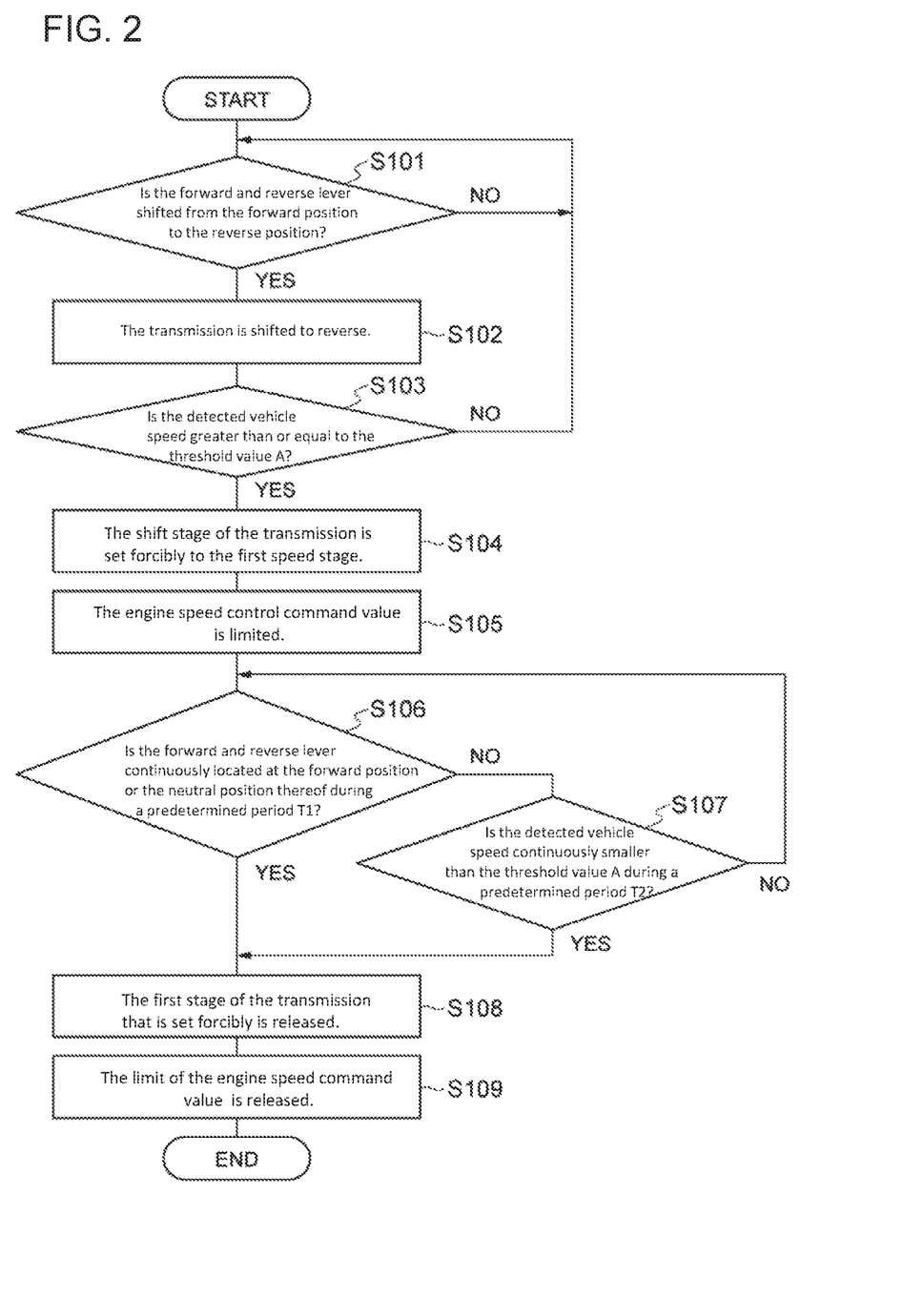
FIG. 2 is a flow chart showing a control processing procedure for forward movement in a switchback operation in details, performed by a controller shown in FIG. 1.

Referring to FIG. 2, the forward switchback operation is performed from the forward movement to the reverse movement. When the steps of the forward switchback operation start, the forward and reverse lever 10 is located at the forward position.

As shown in FIG. 2, in the step S101, the controller 16 determines whether the forward and reverse lever 10 is shifted from the forward position to the reverse position by the forward and reverse lever switch 11. In the step S102, when the controller 16 determines that the forward and reverse lever 10 is shifted from the forward position to the reverse position, the controller 16 controls the forward and reverse shifting solenoid 14 so that the output rotational direction of the transmission 5, or the rotational direction of the wheels 7 becomes reverse movement in the traveling direction of the vehicle.

Figure 4:
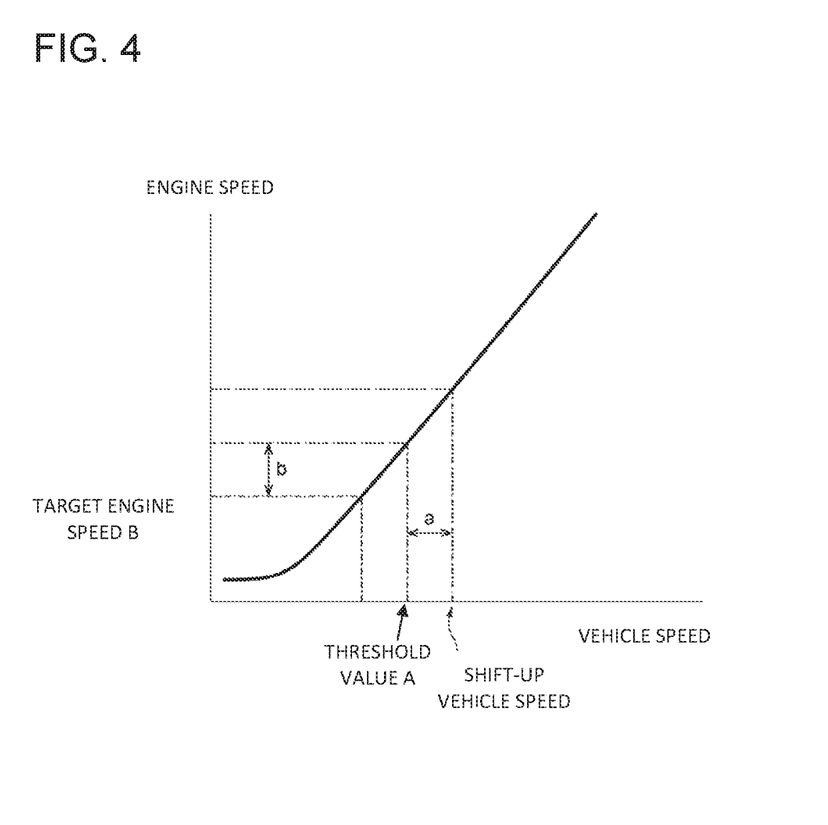
FIG. 4 is a graph showing a relationship between engine speed and vehicle speed.

In the step S103, the controller 16 determines whether the vehicle speed detected by the vehicle speed sensor 12, or the detected vehicle speed is greater or equal to the threshold value A. As shown in FIG. 4, the threshold value A is smaller than the shift-up vehicle speed for shifting from the first speed stage to the 25 second speed stage by a margin a. When the controller 16 determines that the detected vehicle speed is not greater or is not equal to the threshold value A, the controller 16 returns to the step S101 and repeats the above-described steps.

In the step S103, when the controller 16 determines that the detected vehicle speed is greater or equal to the threshold value A, in the step S104, the controller 16 controls the speed change solenoid 15 so that the shift stage of the transmission 5 is set forcibly to the first speed stage.

In the step S105, the controller 16 limits the engine speed command value gradually so that the engine speed varies toward the target engine speed B. Specifically, the controller 16 amends the engine speed command value to reduce the engine speed command value gradually based on the accelerator pedal position of the forklift truck 2 so that the engine speed varies toward the target engine speed B and outputs the amended engine speed command value to the engine ECU 17. That is, the engine control section 18 and the engine ECU 17 limit the engine speed of the engine 3 gradually toward the target engine speed B. As shown in FIG. 4, the target engine speed B is smaller than the engine speed corresponding to the threshold value A of the vehicle speed by a margin b. FIG. 4 shows that the relationship between the engine speed and the vehicle speed during traveling at a constant speed is approximately uniquely determined though the relationship depends on the configuration of the vehicle.

In the step S106, the controller 16 determines whether the forward and reverse lever 10 is continuously located at the forward position or the neutral position thereof during a predetermined period T1 by the forward and reverse lever switch 11. The predetermined period T1 is, for example, 200 ms and serves as a 20 second predetermined period in the present disclosure.

In the step S106, when the controller 16 determines that the forward and reverse lever 10 is not continuously located at the forward position or the neutral position thereof during the predetermined period T1, in the step S107, the controller 16 determines whether the detected vehicle speed is continuously smaller than the threshold value A during a predetermined period T2. The predetermined period T2 is, for example, 200 ms as well as the predetermined period T1 and serves as a first predetermined period in the present disclosure. When the controller 16 determines that the detected vehicle speed is not continuously smaller than the threshold value A during the predetermined period T2, the controller 16 repeats the step S106.

In the step S106, when the controller 16 determines that the forward and reverse lever 10 is continuously located at the forward position or the neutral position thereof during the predetermined period T1 or in the step S107, when the controller 16 determines that the detected vehicle speed is continuously smaller than the threshold value A during the predetermined period T2, in the step S108, the controller 16 controls the speed change solenoid 15 so as to release the first speed stage of the transmission 5 that is set forcibly. Then, the controller 16 controls the speed change solenoid 15 so that the shift stage of the transmission 5 is shifted based on the detected vehicle speed and the position of the forward and reverse lever 10.

In the step S109, the controller 16 releases the limit of the engine speed command value. Specifically, the controller 16 amends the engine speed command value to increase the engine speed command value gradually up to the value based on the accelerator pedal position of the forklift truck 2 and then, outputs the amended engine speed command value to the engine ECU 17.

In the above-described steps, the step S101 is performed in the engine control section 18, the solenoid control section 19, and the solenoid control section 20. The step S102 is performed in the solenoid control section 19. The step S103 is performed in the engine control section 18 and the solenoid control section 20. The step S104 is performed in the solenoid control section 20. The step S105 is performed in the engine control section 18. The steps S106 and S107 are performed in the engine control section 18 and the solenoid control section 20. The step S108 is performed in the solenoid control section 20. The step S109 is performed in the engine control section 18.

Figure 3:
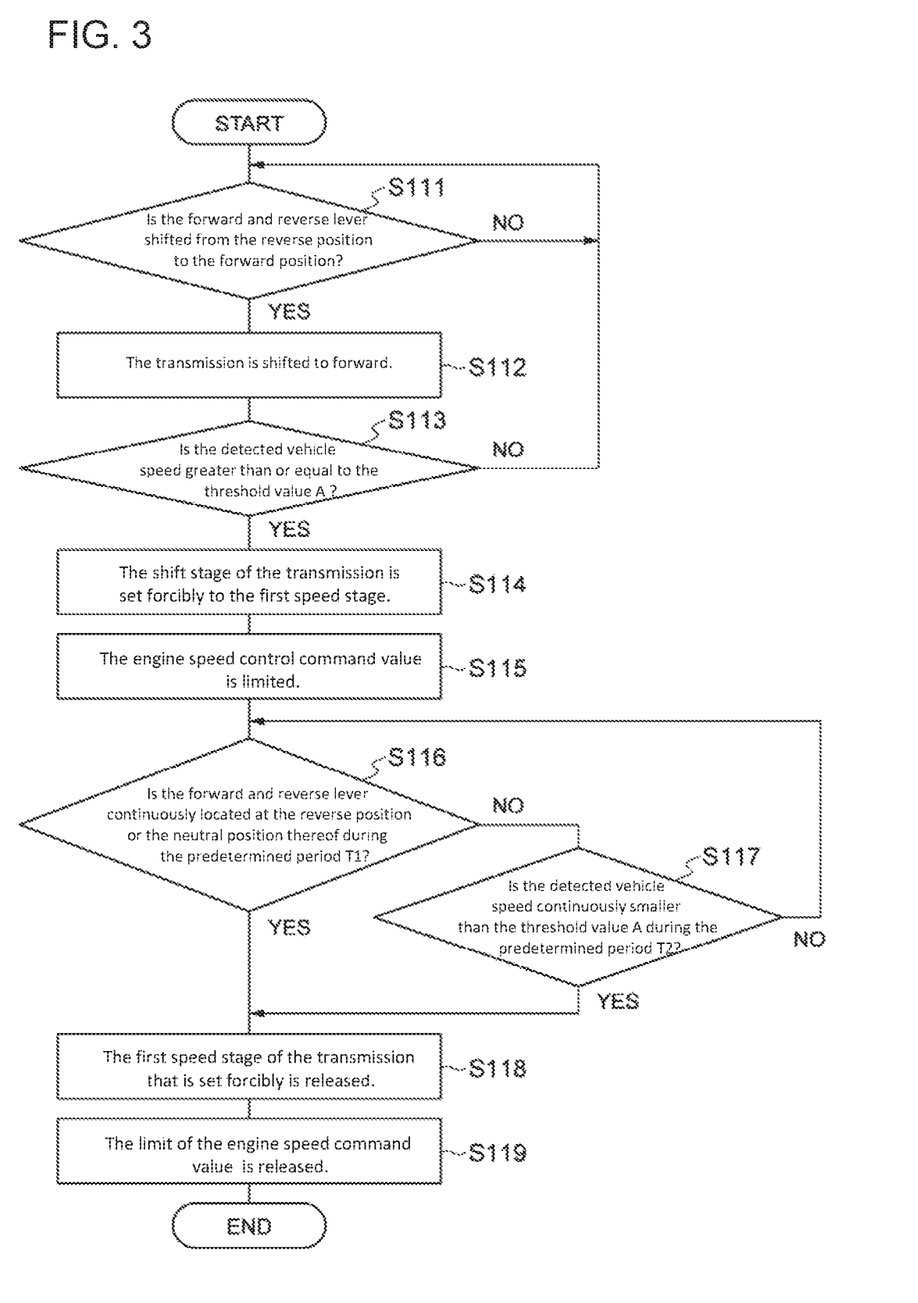
FIG. 3 is a flow chart showing a control processing procedure for reverse movement in the switchback operation in details, performed by the controller shown in FIG. 1.

Referring to FIG. 3, the reverse switchback operation is performed from the reverse movement to the forward movement. When the steps of the reverse switchback operation start, the forward and reverse lever 10 is located at the reverse position.

As shown in FIG. 3, in the step S111, the controller 16 determines whether the forward and reverse lever 10 is shifted from the reverse position to the forward position by the forward and reverse lever switch 11. In the step S112, when the controller 16 determines that the forward and reverse lever 10 is shifted from the reverse position to the forward position, the controller 16 controls the forward and reverse shifting solenoid 14 so that the output rotational direction of the transmission 5, or the rotational direction of the wheels 7 becomes forward movement in the traveling direction of the forklift truck 2.

As similar to the step S103 in FIG. 2, in the step S113, the controller 16 determines whether the detected vehicle speed is greater or equal to the threshold value A. When the controller 16 determines that the detected vehicle speed is not greater or is not equal to the threshold value A, the controller 16 repeats the step S111 described above.

In the step S113, when the controller 16 determines that the detected vehicle speed is greater or equal to the threshold value A, as similar to the step S104 in FIG. 2, in the step S114, the controller 16 controls the speed change solenoid 15 so that the shift stage of the transmission 5 is set forcibly to the first speed stage. As similar to the step S105 in FIG. 2, in the step S115, the controller 16 limits the engine speed command value gradually so that the engine speed varies toward the target engine speed B.

In the step S116, the controller 16 determines whether the forward and reverse lever 10 is continuously located at the reverse position or the neutral position thereof during the predetermined period T1 by the forward and reverse lever switch 11. The predetermined period T1 in the step S116 may be different from the predetermined period T1 in the step S106. In the case, the predetermined period T1 in the step S116 serves as a third predetermined period in the present disclosure.

In the step S116, when the controller 16 determines that the forward and reverse lever 10 is not continuously located at the reverse position or the neutral position thereof during the predetermined period T1, as similar to the step S107 in FIG. 2, in the step S117, the controller 16 determines whether the detected vehicle speed is continuously smaller than the threshold value A during the predetermined period T2. When the controller 16 determines that the detected vehicle speed is not continuously smaller than the threshold value A during the predetermined period T2, the controller 16 repeats the step S116 described above.

In the step S116, when the controller 16 determines that the forward and reverse lever 10 is continuously located at the reverse position or the neutral position thereof during the predetermined period T1 or in the step S117, when the controller 16 determines that the detected vehicle speed is continuously smaller than the threshold value A during the predetermined period T2, as similar to the step 108, in the step 118, the controller 16 controls the speed change solenoid 15 to release the first speed stage of the transmission 5 that is set forcibly. As similar to the step 109 in FIG. 2, in the step S119, the controller 16 releases the limit of the engine speed command value.

In the above-described steps, the step S111 is performed in the engine control section 18, the solenoid control section 19, and the solenoid control section 20. The step S112 is performed in the solenoid control section 19. The step S113 is performed in the engine control section 18 and the solenoid control section 20. The step S114 is performed in the solenoid control section 20. The step S115 is performed in the engine control section 18. The steps S116 and S117 are performed in the engine control section 18 and the solenoid control section 20. The step S118 is performed in the solenoid control section 20. The step S119 is performed in the engine control section 18.

Figure 5:
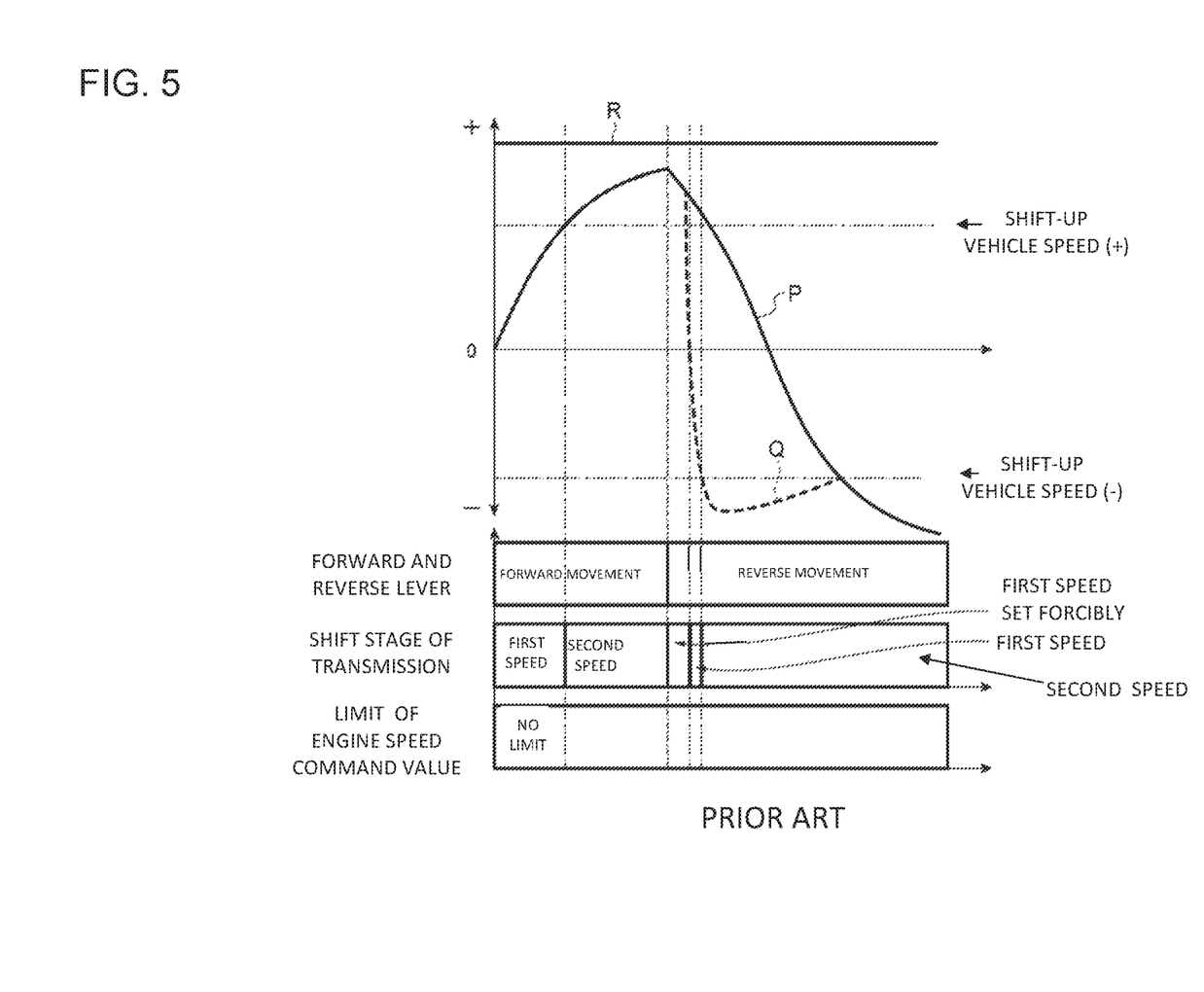
FIG. 5 is a chart showing an operation in which a switchback control apparatus according to a prior art, which is a comparative example, performs forward movement in a switchback operation.

Referring to FIG. 5, the switchback control apparatus according to the prior art includes the forward and reverse lever switch 11 and the vehicle speed sensor 12 and further includes a rotational direction sensor (traveling direction sensor) for detecting the traveling direction of the forklift truck 2 by detecting the rotational direction of the wheels 7.

As shown in FIG. 5, (+) denotes forward movement and (−) denotes reverse movement. The solid line P denotes the actual vehicle speed of the forklift truck. The broken line Q denotes the detected vehicle speed when a tire slip occurs. The solid line R denotes an engine speed command value.

When the vehicle speed of the forklift truck 2 surpasses the shift-up vehicle speed (+) during the forward movement of the forklift truck 2, the transmission 5 is shifted up from the first speed stage to the second speed stage. In the state, when the forward and reverse lever 10 is shifted from the forward position to the reverse position, the wheels 7 rotate reversely, so that the traveling direction of the forklift truck 2 is changed from the forward movement to the reverse movement.

Immediately after the forward and reverse lever 10 is shifted from the forward position to the reverse position, the position of the forward and reverse lever 10 is located at the reverse position while the direction detected by the rotational direction sensor is the one of the forward movement. Accordingly, since the position of the forward and reverse lever 10 does not coincide with the direction detected by the rotational direction sensor, the controller 16 determines that the forward switchback operation starts and then, controls the transmission 5 to be shifted forcibly from the second speed stage to the first speed stage. Subsequently, when the direction detected by the traveling direction sensor becomes the reverse movement, the position of the forward and reverse lever 10 coincides with the direction detected by the rotational direction sensor. As a result, the controller 16 determines the forward switchback operation ends and then, controls the transmission 5 to release the first speed stage of the transmission 5 that is set forcibly.

Then, when the tires 8 grip, the detected vehicle speed (the broken line Q) indicates substantially the same trajectory as the actual vehicle speed (the solid line P). However, when the tires 8 slip, the detected vehicle speed indicates the different trajectory from the actual vehicle speed. In the case, since the rotational direction of the wheels 7 can be detected by the rotational sensor, the controller 16 can control the transmission 5 to release the first speed stage of the transmission 5 that is set forcibly by detecting the changing point of the rotational direction of the wheels 7.

Immediately after the controller 16 releases the first speed stage of the transmission 5 that is set forcibly, the transmission 5 maintains the first speed stage because the detected vehicle speed does not reach the shift-up vehicle speed (−). Subsequently, when the detected vehicle speed surpasses the shift-up vehicle speed (−), the transmission 5 is shifted up from the first speed stage to the second speed stage.

Figure 6:
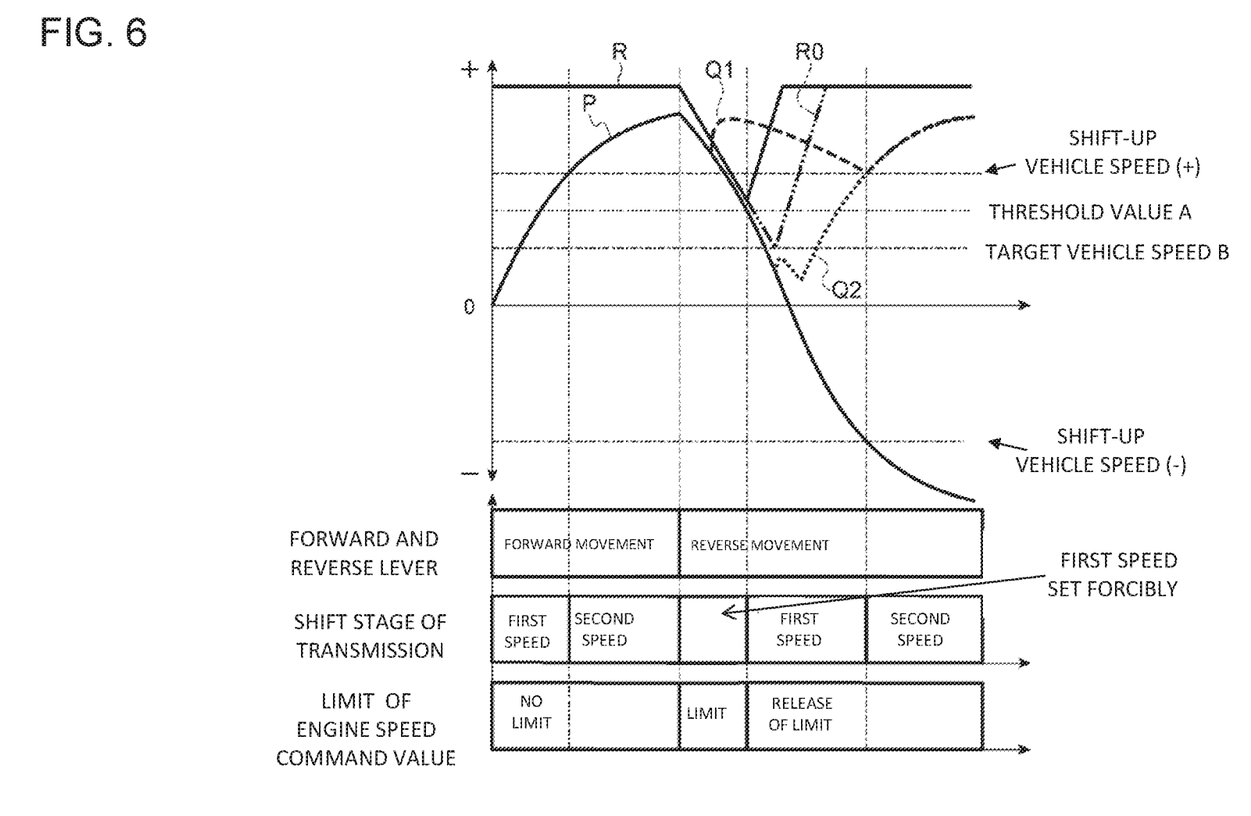
FIG. 6 is a chart showing an operation in which the switchback control apparatus of FIG. 1 performs forward movement in the switchback operation.

As shown in FIG. 6, (+) denotes forward movement and (−) denotes reverse movement. The solid line P denotes the actual vehicle speed of the forklift truck. The solid line R denotes the engine speed command value. The thick broken line Q1 denotes the detected vehicle speed when a tire slip occurs in a case in which the engine speed command value is not limited. The thin broken line Q2 denotes the detected vehicle speed when a tire slip occurs in a case in which the engine speed command value is limited (the solid line R).

When the forward and reverse lever 10 is shifted from the forward position to the reverse position, the detected vehicle speed (approximately the same as the actual vehicle speed) is greater or equal to the threshold value A. As a result, the controller 16 determines that the forward switchback operation starts and then, controls the transmission 5 to be shifted down forcibly from the second speed stage to the first speed stage.

The switchback control apparatus 1 does not include a rotational direction sensor. Since the vehicle speed sensor 12 detects only the absolute value of the vehicle speed, the rotational direction of the wheels 7 is not detected. When the tires 8 slip, the detected vehicle speed (the thick broken line Q1 in FIG. 6) becomes greater than or equal to the shift-up vehicle speed (+) and does not become less than the threshold value A.

When the controller 16 determines that the forward switchback operation starts, the controller 16 limits the engine speed command value (the solid line R in FIG. 6) gradually. As a result, since occurrence of a slip of the tires 8 is reduced, the detected vehicle speed (the thin broken line Q2 in FIG. 6) becomes less than the threshold value A. In the case, the controller 16 determines that the forward switchback operation ends and then, releases the first speed stage of the transmission 5 that is set forcibly.

When the solenoid control section 20 and the speed change solenoid 15 releases the first speed stage of the transmission 5 that is set forcibly, the engine control section 18 and the engine ECU 17 release the limit of the engine speed command value, so that the engine speed command value increases gradually and then, becomes the value corresponding to the accelerator pedal position of the forklift truck 2. The chain double-dashed line R0 is an imaginary line in which the engine speed command value is limited to become the target engine speed B. That is, the engine control section 18 and the engine ECU 17 release the limit of the engine speed of the engine 3.

When the solenoid control section 20 and the speed change solenoid 15 release the first speed stage of the transmission 5 that is set forcibly, the transmission 5 is maintained to the first speed stage because the detected vehicle speed (the thin broken line Q2 in FIG. 6) does not reach the shift-up vehicle speed (+). Subsequently, when the detected vehicle speed surpasses the shift-up vehicle speed (+), the transmission 5 is shifted up from the first speed stage to the second speed stage.

As described above in the present embodiment, the controller 16 determines that the forward and reverse lever 10 is shifted from the forward position to the reverse position or from the reverse position to the forward position by the forward and reverse lever switch 11 and that the vehicle speed detected by the vehicle speed sensor 12 is greater than or equal to the threshold value A that is smaller than the shift-up vehicle speed for shifting from the first speed stage to the second speed stage, the controller 16 controls the transmission 5 to be set to the first speed stage forcibly. Subsequently, the controller 16 releases the first speed stage of the transmission 5 that is set forcibly. Thus, the transition of the transmission 5 to the first speed stage that is set forcibly and the release of the transmission 5 from the first speed stage that is set forcibly can be performed by detecting the rotational direction of the wheels 7 without a rotational direction sensor for detecting the traveling direction of the forklift truck 2. As a result, the cost of the switchback control apparatus 1 and the period of the switchback operation can be reduced.

In the present embodiment, when the controller 16 determines that the forward and reverse lever 10 is shifted from the forward position to the reverse position or from the reverse position to the forward position by the forward and reverse lever switch 11 and the detected vehicle speed is greater than or equal to the threshold value A, the engine speed of the engine 3 is limited toward the target engine speed B that is smaller than the engine speed corresponding to the threshold value A. Though the tires 8 tend to slip easily in the switchback operation, excessive engine torque is suppressed by limiting the engine speed of the engine 3 and then, occurrence of a slip of the tires 8 is reduced, so that the detected vehicle speed is decreased. As a result, the forklift truck 2 can reduce deviation of the detected vehicle speed from the actual vehicle speed. Since the engine speed of the engine 3 is limited, the fuel consumption of the forklift truck 2 can be reduced.

In the present embodiment, since the engine speed of the engine 3 is gradually limited toward the target engine speed B, the sudden change of the engine torque is prevented, so that stall of the engine 3 is prevented.

In the present embodiment, when the detected vehicle speed is continuously smaller than the threshold value A during the predetermined period T2, the controller 16 releases the first speed stage of the transmission 5 that is set forcibly. Accordingly, when the controller 16 releases the first speed stage of the transmission 5 that is set forcibly, the transition of the transmission 5 to the second speed stage is prevented.

In the present embodiment, when the controller 16 determines that the forward and reverse lever 10 is shifted from the forward position to the reverse position by the forward and reverse lever switch 11 and then, the forward and reverse lever 10 is continuously located at the forward position or the neutral position thereof during a predetermined period T1 by the forward and reverse lever switch 11, the controller 16 releases the first speed stage of the transmission 5 that is set forcibly. When the controller 16 determines that the forward and reverse lever 10 is shifted from the reverse position to the forward position by the forward and reverse lever switch 11 and then, the forward and reverse lever 10 is continuously located at the reverse position or the neutral position thereof during a predetermined period T1 by the forward and reverse lever switch 11, the controller 16 releases the first speed stage of the transmission 5 that is set forcibly. That is, when the forward and reverse lever 10 is shifted from the forward position to the reverse position and then, a constant period passes after the forward and reverse lever 10 is shifted to the forward position or the neutral position, the controller 16 releases the first speed stage of the transmission 5 that is set forcibly. When the forward and reverse lever 10 is shifted from the reverse position to the forward position and then, a constant period passes after the forward and reverse lever 10 is shifted to the reverse position or the neutral position, the controller 16 releases the first speed stage of the transmission 5 that is set forcibly.

In the present embodiment, when the controller 16 releases the first speed stage of the transmission 5 that is set forcibly, the limit of the engine speed of the engine 3 is released, so that the engine speed of the engine 3 in accordance with the accelerator pedal position is ensured.

The present disclosure is not limited to the above-described embodiment. For example, in the above-described embodiment, when the controller 16 determines that the detected vehicle speed is continuously smaller than the threshold value A during the predetermined period T2 or that the forward and reverse lever 10 is continuously located at the forward position or the neutral position thereof, or at the reverse position or the neutral position thereof during a predetermined period T1 by the forward and reverse lever switch 11, the controller 16 releases the first speed stage of the transmission 5 that is set forcibly, but the present disclosure is not limited to the embodiment. Only when the controller 16 determines that the detected vehicle speed is continuously smaller than the threshold value A during the predetermined period T2, the first speed stage of the transmission 5 that is set forcibly may be released. Only when the controller 16 determines that the forward and reverse lever 10 is continuously located at the forward position or the neutral position thereof, or at the reverse position or the neutral position thereof during a predetermined period T1 by the forward and reverse lever switch 11, the first speed stage of the transmission 5 that is set forcibly may be released.

In the case in which the controller 16 releases the first speed stage of the transmission 5 that is set forcibly only when the controller 16 determines that the forward and reverse lever 10 is continuously located at the forward position or the neutral position thereof, or at the reverse position or the neutral position thereof during a predetermined period T1 by the forward and reverse lever switch 11, the engine speed of the engine 3 may not be limited toward the target engine speed B.

The switchback control apparatus 1 according to the above-described embodiment is mounted in an engine-powered forklift truck 2, but the present disclosure may be applied to any industrial vehicles in which the rotation of the engine is transmitted to the wheels via the transmission.

What is claimed is:

1. A switchback control apparatus for an industrial vehicle in which rotation of an engine is transmitted to a transmission to rotate wheels, comprising:
    a forward and reverse operating part having a forward position, a reverse position, and a neutral position for shifting the transmission to forward movement, reverse movement, and neutral state, respectively;
    a forward and reverse position detector detecting a position of the forward and reverse operating part;
    a vehicle speed detector detecting a vehicle speed of the industrial vehicle; and
    a shift control section setting the transmission forcibly to a first speed stage when the shift control section determines that the forward and reverse operating part is shifted from the forward position to the reverse position or from the reverse position to the forward position by the forward and reverse position detector and that a vehicle speed detected by the vehicle speed detector is greater than or equal to a threshold value that is smaller than a shift-up vehicle speed at which the transmission is shifted from the first speed stage to a second speed stage, and then, releasing the first speed stage of the transmission that is set forcibly.

2. The switchback control apparatus for the industrial vehicle, according to claim 1, including an engine speed control section, wherein when the shift control section determines that the forward and reverse operating part is shifted from the forward position to the reverse position or from the reverse position to the forward position by the forward and reverse position detector and that a vehicle speed detected by the vehicle speed detector is greater than or equal to the threshold value, the engine speed control section limits an engine speed of the engine toward a target engine speed that is smaller than an engine speed corresponding to the threshold value.

3. The switchback control apparatus for the industrial vehicle, according to claim 2, wherein the engine speed control section limits the engine speed of the engine gradually toward the target engine speed.

4. The switchback control apparatus for the industrial vehicle, according to claim 2, wherein when a vehicle speed detected by the vehicle speed detector is continuously smaller than the threshold value during a first predetermined period, the shift control section releases the first speed stage of the transmission that is set forcibly.

5. The switchback control apparatus for the industrial vehicle, according to claim 1, wherein when the shift control section determines that the forward and reverse operating part is shifted from the forward position to the reverse position by the forward and reverse position detector and then, the forward and reverse operating part is continuously located at the forward position or the neutral position during a second predetermined period by the forward and reverse position detector, the shift control section releases the first speed stage of the transmission that is set forcibly, and wherein when the shift control section determines that the forward and reverse operating part is shifted from the reverse position to the forward position by the forward and reverse position detector and then, the forward and reverse operating part is continuously located at the reverse position or the neutral position during a third predetermined period, the shift control section releases the first speed stage of the transmission that is set forcibly.

6. The switchback control apparatus for the industrial vehicle, according to claim 2, wherein when the shift control section releases the first speed stage of the transmission that is set forcibly, the engine speed control section releases a limit of the engine speed of the engine.

* * * * *